Oct. 24, 1967  R. BARKSTROM ETAL  3,348,780
COMBINATION CORN SHELLING AND COB GRINDING APPARATUS
Filed July 21, 1965  2 Sheets-Sheet 1
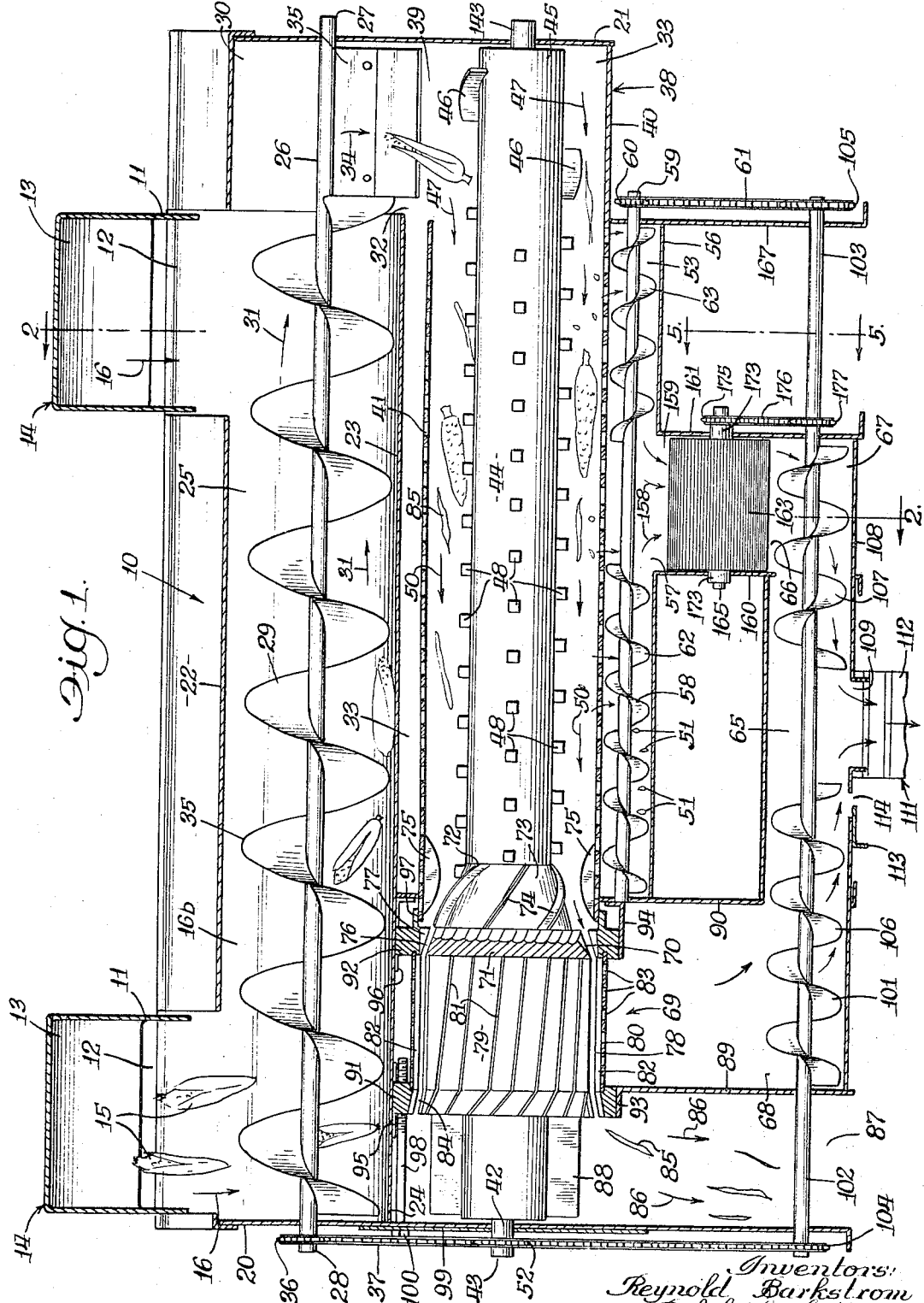

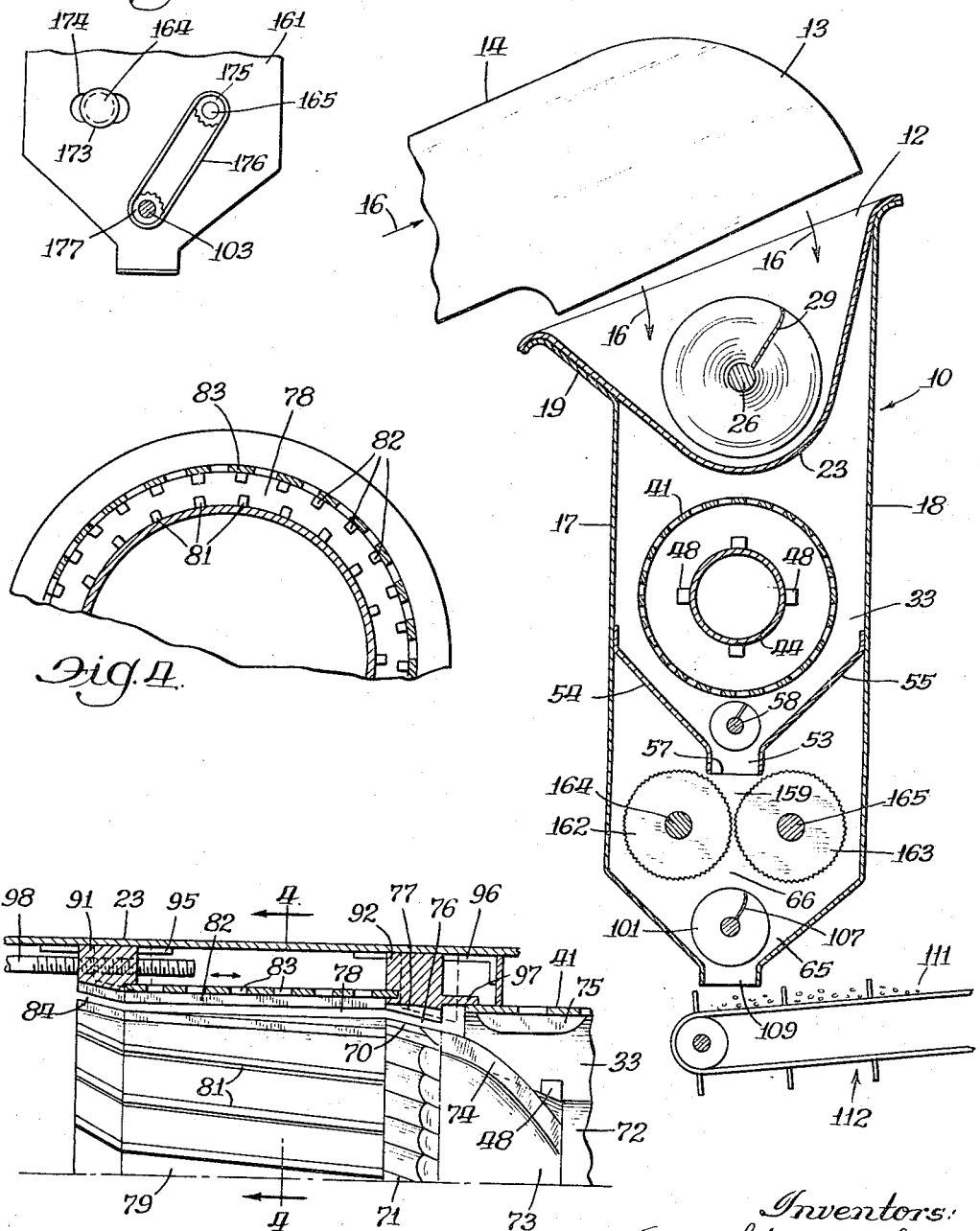

United States Patent Office 3,348,780
Patented Oct. 24, 1967

3,348,780
COMBINATION CORN SHELLING AND COB GRINDING APPARATUS
Reynold Barkstrom, Moline, Ralph L. Sutton, Rock Island, and Dwight B. Carlson, Rapids City, Ill., assignors to International Harvester Company, Chicago, Ill., a corporation of Delaware
Filed July 21, 1965, Ser. No. 473,651
18 Claims. (Cl. 241—101)

The instant invention relates to apparatus adapted for feed preparation. Particularly, the invention relates to a combination corn sheller-grinder and cob grinder adapted for preparation of feed incident to and while harvesting.

Conventionally, after feed corn has been harvested, it is shelled and may be immediately cracked or stored for subsequent cracking. In any event, following cracking, the cracked corn may be stored for subsequent use. Cobs, which are produced at the time of shelling, may be ground for feed or stored for subsequent grinding.

When feed is prepared, desired proportions of cobs and shelled or cracked corn, depending upon requirements, are manually mixed together. Preparing feed thusly requires substantial manual labor.

To minimize manual labor incident to feed preparation, a recent prior device (U.S. Patent 2,970,780, R. R. Bowen, Feb. 7, 1961) teaches a combination corn sheller and cob grinder in which the cobs of shelled corn can be ground and recovered simultaneously with the corn shelled from such cobs. While such prior device constitutes an advance in the art, it is not entirely satisfactory because no effective means is provided for removal of husks, no means is provided for adjusting the relative size of the ground cob particles, no provision is made for varying the proportion of the ground cobs and the shelled corn over a range, and no provision is made for cracking the corn.

In connection with the latter, while means are provided for either discharging the cobs completely and preventing the admixture thereof with the shelled corn, or grinding the cobs and mixing such ground cobs with the shelled corn, such means provide only the alternative of the two extremes, that is, either all of the cobs are kept from mixing with the corn, or all of the cobs are ground and mixed into the corn. The only cob and corn proportioning control in such prior device results from provision of intermittent periods during which cobs are ground and mixed with the corn and alternate periods when cobs are not ground and are not mixed with the corn, and varying the lengths of the periods.

The essential deterrent to the development of an adequate combination device of the indicated class has been the problem of effective elimination of husks from the finished product. Solution to the problem is required because husks or husk matter are undesirable feed components, and it is of the essence of a combination device of the class indicated that any end product which includes cobs be substantially free of husk material.

It is an object of the instant invention to provide a combination corn shelling-grinding and cob grinding apparatus adapted to produce end products comprising shelled corn, cracked corn, ground cob, mixtures of shelled corn and ground cob, and mixtures of cracked corn and ground cob.

A further object of the invention is the provision in such a device of means for controlling ground cob fineness.

Still a further object of the instant invention is the provision in such a device of means for elimination of husks from the collected end products.

It is an additional object of the instant invention to provide in such device means for removing and grinding the corn and removing and grinding of the cobs separately from each other.

Another object of the instant invention is the provision of means in a device of the class described for selectively varying the proportions of ground corn cob and corn ingredients in the end product of such device.

Yet a further object of the instant invention is the provision of a device of the class described characterized by a corn sheller and cob grinder in operative association and having means for delivering cobs, from which the corn has been shelled, from the sheller to the cob grinder, means for separately collecting the shelled corn and the ground cobs and means for mixing such corn and ground cobs together in selected proportions and having means for eliminating the husks to provide husk-free end products.

Still another object of the invention is that such device be adapted for use with or as an appendment to corn harvesting equipment.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a vertical sectional view of an apparatus embodying the instant invention taken in a plane transversely of a harvesting path.

FIG. 2 is a view taken substantially on the line 2—2 of FIG. 1 and looking in the direction of the arrows.

FIG. 3 is an enlarged detailed view of a portion of the cob mill in vertical section through the cob mill casing.

FIG. 4 is a view taken substantially along the line 4—4 of FIG. 3 and looking in the direction of the arrows.

FIG. 5 is a view taken substantially on the line 5—5 of FIG. 1 and looking in the direction of the arrows.

Referring now more particularly to the drawings, there is provided a housing 10 having a longitudinal axis which is adapted for disposition transversely of a harvesting path and relative to which orientation is made in this description. The housing 10 is carried on or adjacent a corn harvesting mechanism only sufficient of which is shown to facilitate comprehension of this description. To that end, housing 10 is provided with a pair of upwardly directed extensions 11 defining a pair of corn receiving openings 12 which are disposed at opposite side portions of the housing 10.

As illustrated in FIG. 2, said corn receiving openings 12 are adapted for disposition in receiving alignment with the delivery end portions 13 of a pair of elevator housings 14, respectively. The elevator housings 14 are parts of a pair of corn harvesting row units which may be carried on opposite sides of a mobile harvesting vehicle for aggressive detachment of ears of corn 15 and delivery thereof in a direction of arrow 16, as shown in FIG. 2, by means including first elevators (not shown) within housings 14 through the corn receiving openings 12.

As illustrated in FIG. 2, the housing 10 may comprise a vertical front wall 17 and rearwardly spaced therefrom a vertical wall 18, the front wall 17 being flared upwardly and forwardly, as illustrated at 19, to increase the size of the corn receiving opening 12. The housing 10 is also defined by a pair of parallel side walls 20 and 21 and a roof 22 which extends between the corn receiving extensions 11, as illustrated in FIG. 1.

A partition or divider 23, which is mounted with one side part 24 thereof disposed adjacent the side wall 20, may be connected to the front and rear walls 17 and 18, as illustrated in FIG. 2. The partition 23 has a portion which is spaced downwardly from the roof or cover 22 to provide a floor for an elongated chamber 25 into opposite end portions of which harvested corn is dropped through the corn receiving extensions 11. The opposite end portions 27 and 28 of the shaft 26 of a screw conveyor or auger 29 are journalled in the opposite side walls 20 and 21, the shaft 26 medially of the end portions 27 and 28 being disposed in the chamber 25 with the auger thread turned in one direction such that ears of corn entering the chamber 25 will be carried in a path shown by arrows 31 to one end portion 30 of said chamber beneath which partition 23 terminates.

Thereby, an opening 32 is provided through which the chamber 25 is communicatively connected to a corn shelling chamber 33 into which corn falls in the direction of arrows 34 from the chamber 25. To facilitate the delivery of the corn through the opening 32 into the shelling chamber 33, the thread of auger 29 does not extend on the shaft 26 over the opening 32. In its place, a feeding web, flat or paddle 35, having an inner end portion secured to the shaft 26, extends radially therefrom, as illustrated in FIG. 1. To drive the auger 29, sprocket wheel 36 may be rigidly secured on the shaft end portion 28, said sprocket wheel being operably engaged by a sprocket chain 37 which is operably connected to power transmission means in any suitable or conventional manner.

The corn shelling chamber 33 is defined by a cylindrical casing generally designated by the numeral 38. Casing 38 has an upper opening 39 common or in association with the opening 32, whereby communicative connection is provided between the chamber 25 and the chamber 33, as illustrated in FIG. 1. The cylindrical casing 38 is elongated and has an imperforate section 40 common with the housing or casing 10 which is disposed below the opening 39 and forms a floor for the chamber 33. The remainder of the casing 38 comprises a cylindrical section or concave 41 fabricated of foraminous or perforated screen material adapted for the passage of kernels of corn.

Shaft means 42, having opposite end portions 43 and 143 which are projected through the opposite casing side walls 20 and 21 and journalled therein, provide an axis of rotation parallel to the shaft 26. An elongated cylinder 44 which defines a corn sheller rotor is rigidly secured concentric to the shaft means 42 for rotation therewith. Cylinder 44 has an end section 45 disposed in that part of the chamber 33 which is defined by the casing section 40. The cylinder section 45 has secured peripherally thereof and radially projecting therefrom a plurality of elongated curved flights or feeding ribs 46 which extend in a manner such that corn will be fed into the concave 41 in the direction of the arrows 47.

A plurality of square-cut conventional corn shelling projections 48, only some of which have been numbered in the drawings, are rigidly secured in aligned disposition along spiral paths on that portion 49 of the surface or periphery of the cylinder 44 which is disposed within the concave 41, as illustrated in FIG. 1. The projections 48 function in a conventional manner, that is, to cause abrasion of the corn against the inner surface of the concave 41 to liberate the husks and kernels 51 and simultaneously to drive other vegetation longitudinally of the rotor 44 in the direction of arrows 50, only some of which have been numbered in FIG. 1.

It is appreciated that the design of the rotor 44 and the concave 41 is such that substantially all the kernels 51 will be removed from the cobs within the chamber 33, and that such kernels 51 upon removal will fall or be pushed from casing 38 through the foramina in the concave 41. To the end that the shaft means 42 will rotate to operate the corn husking and shelling mechanism which has been described, a conventionally driven sprocket wheel 52 may be secured on shaft end portion 43, as illustrated in FIG. 1.

As illustrated in FIGS. 1 and 2, an elongated trough 53 is disposed below the concave 41 in receiving alignment therewith, said trough 53 extending longitudinally of said cylinder 44. Trough 53 is defined by a pair of upwardly extending walls 54 and 55, one of which is inclined from the trough 53 to the forward wall 17 to which it is connected, and the other of which is inclined from the trough 53 to the rear wall 18 to which it is connected, as illustrated in FIG. 2. As illustrated in FIG. 1, the trough 53 is defined by a floor 56 having therein a medial opening 57. A screw conveyor or auger 58 which extends longitudinally of said trough 53 is journalled for rotation therein. To the end that auger 58 is driven, its shaft has an end extension 59 projected through a housing side wall, said extension having secured thereon a sprocket wheel 60 which may be driven by a sprocket chain 61, as illustrated in FIG. 1. The auger 58 comprises a pair of oppositely turned threads 62 and 63 which direct shelled kernels 51 in the trough 53 toward trough opening 57 through which all of the shelled corn falls in the direction of arrows 158, only some of which have been numbered, into a corn cracking chamber 159.

The cracking chamber 159 is defined by a pair of parallel side walls or plate 160 and 161 which, in the illustrated embodiment, extend transversely of the housing walls 17 and 18, as illustrated in FIG. 1. The plates 160 and 161 depend from the trough floor 56 which thereto has connected about the opening 57 the upper ends of said plates. A pair of corn cracking rolls 162 and 163 are mounted in operable association in the cracking chamber 159, with the opposite end portions of the shafts 164 and 165 of said cracking rolls journalled in the plates 160 and 161, as illustrated in FIG. 1. Conventional means are provided for adjusting the cracking rolls 162 and 163 relative to each other, such that they can be set to crack kernels at any desired coarseness or to permit them to pass the cracking rolls uncracked. This can be accomplished, for example, by providing slots 174 in side walls 160 and 161 in which the bearings 173 journalling shaft 164 can be adjustably secured. Means for driving one or both of the cracking rolls 162 and 163 are provided which may be in the form of a sprocket 175 carried on shaft 165 connected by a chain or belt 176 to a sprocket 177 carried by shaft 103. See FIG. 5.

The cracking chamber plates 160 and 161 define a delivery opening 66 for passage of corn material from the cracking chamber 159 into one end portion 67 of a collection chamber or trough 65.

As illustrated in FIG. 1, the collection chamber 65 is elongated, extending longitudinally of the rotor 44, and has a portion 68 which is disposed beneath and in receiving alignment with a cob mill generally designated 69. As illustrated in FIGS. 1 and 3, the cob mill 69 comprises a rotating conical burr member or section 71 defined by a plurality of adjacent external burrs or outwardly facing cutting edges 70 which extend axially on a conical cutting surface. Burr member 71 is mounted concentrically of the axis of and for rotation with the shaft means 42.

The conical burr member 71 is spaced axially from the delivery end 72 of the rotor 44 from which end 72 there is projected an outwardly flared cob and husk feeder 73. Feeder 73 comprises a cone section having a plurality of external or peripheral outwardly projected feeding ribs 74 which extend along curved paths longitudinally of the path of feeding. A plurality of stationary guides or bosses 75, a pair of which is seen in FIG. 1, project inwardly or centrally from the inner surface of the concave 41 adjacent the feeder 73. Thereby, husk and cobs advancing in the direction of the arrows 50 are fed into the cob mill 69 through an inlet opening 76 which is inwardly defined by rotatable burr member 71 carrying cutting edges 70 rotatable with said burr member 71.

A relatively stationary burr member 77 outwardly defines the inlet opening 76, and said stationary burr member 77 comprises a plurality of adjacent burrs disposed concentric with the shaft means 42 and about the rotatable burr member 71, as illustrated in FIGS. 1 and 3. Reference to FIG. 1 discloses that the delivery end of the feeder 73 is in engagement with or joined to the receiving end of the burr member 71. It is further observed that the feeder 73 is mounted on or operably connected to the shaft means 42 in a manner such that said feeder 73 rotates with rotor 44.

The inlet opening 76 provides the passage from the chamber 33 into a chamber 78 of the cob mill. The chamber 78 although illustrated as annular may also be conical, being concentric with the axis of shaft means 42 and having therein mounted a rotatable cylinder 79. The cylinder 79 conforms to the shape of chamber 78, thus if chamber 78 is conical the cylinder 79 would likewise be conical. Externally or peripherally the chamber 78 is defined by a foraminous drum, grate or cob concave 80 which comprises the cob mill housing.

The cylinder 79 is mounted concentrically and for rotation with the shaft means 42. The diameter of the cylinder 79 is substantially the same as the largest diameter of the rotatable burr member 71, that is, the diameter of the burr member at its inner or discharge end into the chamber 78. The cylinder 79 has secured thereon a plurality of elongated feeding ribs 81, only some of which are numbered in the drawings. The feeding ribs are projected outwardly from the outer surface or periphery of said cylinder 79 in a spiral path having a large radius of curvature. From the inner surface of the concave or grate 80 there are projected spaced apart relatively stationary bars 82 which are mounted parallel to the axis of the shaft means 42 and extend longitudinally thereof.

By reason of the foregoing construction, cobs, when fed in normal operation, will pass through the opening 76 and be comminuted or cut up by co-action of the rotating burr member 71 and the stationary burr member 77 and then will be forced into the chamber 78 by the flow of oncoming material from the chamber 33. Once inside the chamber 78, the chopped cob material may be further reduced in size, or ground, as the cylinder 79 rotates, and then passed through the concave foramina 83, only some of which have been numbered in FIGS. 1 and 3.

The husks, the fibrous character of which precludes their reduction in size for passage either through concave 41 or through the foramina 83, will be carried in a general direction axially of the shaft means 42 along with the cobs, first, in chamber 33, and, thereafter, by co-action of feeding ribs 81 and bars 82, from the cob mill 69 through a cob mill discharge opening 84. Husks, in the form of trash 85, which are discharged through the opening 84 will fall from housing 10 in a direction of arrows 86 through a trash discharge opening 87 in the lower end of said housing 10, as illustrated in FIG. 1. To facilitate the trash discharge, a paddle member 88 having radially extending fins is secured adjacent the discharge opening 84 concentric with the shaft means 42 for rotation therewith, the fins of the paddle 88 being of a length adequate to preclude congestion of trash about said opening 84.

As illustrated in FIG. 1, the cob mill 69 is disposed in vertical alignment with and between the end portion 68 of the collection chamber 65 and an end portion 166 of chamber 25 which extends laterally beyond the rotor 44. A pair of transversely spaced apart vertical housing plates or partitions 89 and 90 define the path between the cob mill 69 and the end portion 68 of the chamber 65 into which the cob mill 69 feeds. As illustrated in FIGS. 1 and 3, the opposite ends of concave 80 are secured to a pair of annular bushings 91 and 92 which, together with said concave 80, are adjustable over a small range axially of the shaft means 42.

To provide such adjustment, a pair of bushing supports 93 and 94 are carried by the housing plates 89 and 90, as illustrated in the lower left-hand portion of FIG. 1. The upper portions of said bushings 91 and 92 may be splined on keys 95 and 96 or the like which are mounted below the floor 23 which defines chamber part 166. The bushing 92 has projected axially therefrom an annular flange 97 which is concentric with and axially slidable on the outer annulus defined by the discharge end of the concave 41. An elongated axially extending screw 98 has its inner threaded end portion threaded into the bushing 91. The opposite end portion of the screw 98 is projected through the side housing member 20 which includes a plate 99 against which the head 100 of the screw 98 bears. By rotation of the screw 98, the bushing 91 and accordingly therewith the bushing 92 and the concave 80 will be either drawn or driven in opposite directions depending upon the direction of screw rotation.

Attention is now invited to the burr member 77. It is secured to and projects inwardly from bushing 92, and is stationary in the sense that it is not rotatable and, upon adjustment, remains in fixed position relative to burr member 71. The burrs comprising burr members 77 have inwardly facing cutting edges which are disposed along a conical cutting surface. Accordingly, spacing of the cutting edges of the burr members 71 and 77 can be adjusted by means of the screw 98 to vary the size of opening 76. Thereby, the fineness or particle size to which the cobs will be comminuted upon entering chamber 78 can be selectively varied.

As illustrated in FIG. 1, ground cobs will be gravity fed into the end portion 68 of the collection chamber 65 from cob mill 69. An elongated auger or transverse conveyor 101 is disposed within the chamber 65 extending longitudinally thereof, the input and work end portions 102 and 103 of the shaft of said auger 101 being journalled in the housing member 89 and a housing member 167 and respectively supporting a pair of sprocket wheels 104 and 105. The sprocket wheel 104 is mounted on input end portion 102, and the sprocket wheel 105 is mounted on the opposite end portion 103, being adapted to transmit a driving force through the chain 61, heretofore described, to the sprocket wheel 60.

The auger 101 comprises oppositely turned threads 106 and 107 the adjacent ends of which are spaced apart axially of the shaft of said auger, said threads 106 and 107 being turned in a manner adapted to direct material in the chamber 65 medially. As illustrated in FIG. 1, the thread 106 is disposed in chamber portion 68, and the thread 107 is disposed in chamber portion 67. The chamber 65 is defined by a floor 108 having a medial downwardly directed opening 109 disposed between adjacent ends of the threads 106 and 107, whereby ground cobs and the corn delivered by the conveyor 101 will be gravity fed through the opening 109 into a conveyor chamber 111.

In the chamber 111 there may be disposed a belt conveyor or the like generally designated 112 which will convey product falling from chamber 65 toward a storage area in a conventional manner; that is to say, the conveyor 112 may lead to an elevator which will translocate the finished product from the apparatus herein described.

The floor 108 of the portion 68 of the chamber 65 is in part defined by a sliding gate 113 which is mounted in any suitable manner to provide a closable port 114 which is disposed in the path along which the ground cobs are driven. The port 114 provides means by which selected amounts of the ground cobs can be removed from the chamber 65 by gravity. Such removed ground cob may be collected, if desired, by apparent means. Because the size of port 114 is variable, the quantity of the ground cobs reaching the opening 109, and, accordingly, mixed with the corn, can be controlled in a manner such that cob concentration in the final mixture may be comprised of all or none of the processed cob, or of any selected quantity falling in the range between such extremes.

From the foregoing, it is appreciated that a combination apparatus or device is provided for the preparation of corn feed products simultaneously with harvesting thereof, by which apparatus the character of the finished product can be controlled to comprise corn kernels, cracked corn, a mixture of ground cobs and corn kernels, and a mixture of cracked corn and ground cobs, the concentration and particle size of the ground cobs in the mixture products being adjustable over selected ranges controlled by the combination apparatus.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A corn shelling and cob grinding device comprising a sheller housing having a corn intake port, a cob discharge end and foramina for passing separated grain from said housing; a rotor journalled in said housing; abrading means disposed peripherally of said rotor; means for feeding material axially of said rotor through said cob discharge end; a perforate casing disposed in cob receiving association with said cob discharge end and having a debris discharge opening and perforations for passage of ground cobs from said casing; a cob grinder driven in said casing; feeder members disposed peripherally of said cob grinder for feeding debris axially of said grinder through said debris discharge opening; means defining a collection chamber having opposite portions disposed in receiving alignment with said foramina and said perforations, and proportioning means for continuously mixing ground cob and grain in selected ratios.

2. The device defined in claim 1 in which the proportioning means comprises driven means continuously conveying the cob and the grain toward a common station and ground cob removal means for removing selected fractions of ground cob being conveyed toward said common station.

3. The device defined in claim 1 in which the proportioning means comprises a mixing station disposed medially of said collection chamber; driven means for conveying grain and ground cobs from the opposite portions of said collection chamber to said mixing station, and cob removal means for selectively eliminating varying portions of the ground cob from the path along which the ground cob is conveyed toward said mixing station.

4. The device defined in claim 3 in which the cob removal means is characterized in that one of the opposite portions of the collection chamber defines a cob removal opening, and a cover mounted adjacent said opening and adjustably controlling the size thereof, whereby varying amounts of ground cob can be removed from the collection chamber while being conveyed to the mixing station.

5. A corn shelling and cob grinding device comprising a sheller housing defining a foraminous grain passing concave and having an inlet opening and a cob outlet portion; a rotor rotatable in said housing; abrading members disposed axially and peripherally of said rotor for axially thereof moving cobs and therefrom removing grain; a casing defining a perforated ground cob passing concave and having a cob receiving opening disposed in receiving association with said cob outlet portion; rotatable means mounted in said casing for comminuting cobs and driving the same when ground against said perforated ground cob passing concave; a collection chamber having a pair of collection portions, one thereof disposed in ground cob receiving alignment with said perforated ground cob passing concave; a cracking housing having a grain receiving opening disposed in receiving association with said foraminous grain passing concave and a discharge opening in delivery association with the other of the portions of said collection chamber; grain cracking means mounted in said cracking housing; proportioning means for removing variable fractions of ground cob from the collection chamber, and conveying means for delivery of the remainder of the material in the collection chamber to a common station.

6. The device defined in claim 5 in which the grain cracking means comprises a pair of cooperative grain cracking rollers and means for disassociating said rollers, whereby grain received in said cracking housing may be selectively cracked.

7. The device defined in claim 5 further characterized in that said casing has a husk outlet opening, and feeding ribs mounted peripherally of said rotatable means for feeding husks axially through said husk outlet opening.

8. A corn shelling and cob grinding device comprising shaft means providing an axis of rotation; a rotatable corn shelling cylinder mounted concentrically with said axis; a sheller housing disposed about said cylinder and having a crop inlet opening and grain passing perforations; means mounted on said cylinder for abrading crop and feeding husks axially; a grinding rotor rotatably mounted concentrically with said axis; a casing disposed about said grinding rotor and having a husk outlet opening and ground cob passing foramina; grinding and feeding means mounted on said grinding rotor for comminuting cob material and feeding husks axially and toward said husk outlet opening; grain and ground cob collection means disposed in receiving association with said grain passing perforations and said ground cob passing foramina, and cob feeding means mounted concentrically with said axis for transferring cobs axially from said sheller housing to said grinder casing.

9. The device defined in claim 8 further characterized by means for continuously combining ground cob and grain and adjusting the proportion of each to the other.

10. The device defined in claim 8 further characterized by conveying means for continuously combining ground cob and grain and means for varying the quantity of ground cob available for such continuous combining.

11. The device defined in claim 8 in which said cob feeding means comprises a rotatable member mounted for rotation with said shelling cylinder and said grinding rotor, and husk feeding members mounted peripherally of said rotatable member for feeding husks axially from said sheller housing toward said casing.

12. The device defined in claim 8 in which said cob feeding means is mounted for rotation with said cylinder and said grinder rotor and comprises a rotatable cone-like section disposed between said cylinder and said grinder rotor and flared outwardly as it extends from the former to the latter, said cob feeding means defined by curved ribs mounted peripherally of said cone-like section and extending in curved paths longitudinally of said axis.

13. A corn shelling and cob grinding device comprising shaft means providing an axis of rotation; a rotatable corn shelling cylinder mounted concentrically with said axis; a sheller housing disposed about said cylinder and having a crop inlet opening and grain passing perforations; means mounted on said cylinder for abrading crop and feeding cobs and husks axially; a rotor rotatably mounted concentrically with said axis; a casing disposed about said rotor and having a husk outlet opening and ground cob passing foramina; feeding means mounted on said rotor for feeding husks axially and toward said husk outlet opening; grain and ground cob collection means disposed in receiving association with said grain passing perforations and said ground cob passing foramina, said casing having a cob receiving opening in receiving alignment with said sheller housing; a rotatable cob grinder mounted concentrically with said axis and disposed in said cob receiving opening, and cob feeding means mounted concentrically with said axis for transferring cobs axially from said sheller housing into said cob receiving opening.

14. The device defined in claim 13 in which the cob grinder comprises a plurality of internal and external cob cutting blades disposed about said axis and rotatable relative to each other, said internal and external blades defining therebetween a path lying in a conical section.

15. The device defined in claim 13 in which the cob grinder comprises a conical section mounted concentrically with said axis for rotation with said rotor; a plurality of rotatable blades mounted peripherally of said section and extending longitudinally of said axis within said cob receiving opening, and a plurality of stationary blades disposed about said rotatable blades and extending inwardly from said casing in cob grinding association with said rotatable blades.

16. The device defined in claim 13 in which the cob grinder comprises a rotatable cutting section concentric with said axis and mounted for rotation with said shelling cylinder and said rotor; rotatable cutters mounted peripherally of said cutting section; a plurality of stationary cutting blades mounted about said axis and spaced outwardly from said rotatable cutters, and means for adjusting the spacing between said stationary cutting blades and said rotatable cutters to vary the grade of the cob particles produced by said cob grinder.

17. The device defined in claim 16 in which the means for adjusting the spacing between said stationary cutting blades and said rotatable cutters comprises means for adjusting said casing longitudinally of said axis, said stationary cutting blades and said rotatable cutters being angular, said stationary cutting blades projecting centrally toward said rotatable cutters.

18. The device defined in claim 15 in which said stationary blades are conically disposed and connected to said casing, means providing a slide on which said casing is adjustably mounted and means for adjusting said casing on said slide longitudinally of said axis, whereby the spacing between the stationary and rotatable blades is adjustable.

References Cited

UNITED STATES PATENTS

| 2,631,785 | 3/1953 | Bogie | 241—78 |
| 2,834,387 | 5/1958 | Trsugott | 146—76 |
| 3,038,669 | 6/1962 | Lykken et al. | 241—10 |
| 3,062,461 | 11/1962 | Wetmore | 241—101 XR |
| 3,128,053 | 4/1964 | Renaud | 241—101 |
| 3,146,960 | 9/1964 | De Graff | 241—159 |
| 3,194,288 | 7/1965 | Dodgen et al. | 241—78 XR |

WILLIAM W. DYER, JR., *Primary Examiner.*

W. D. BRAY, *Assistant Examiner.*